US012617203B2

(12) United States Patent
Kato

(10) Patent No.: US 12,617,203 B2
(45) Date of Patent: May 5, 2026

(54) LIQUID DISCHARGE HEAD, ELEMENT SUBSTRATE AND METHOD FOR MANUFACTURING THE SAME

(71) Applicant: CANON KABUSHIKI KAISHA, Tokyo (JP)

(72) Inventor: Masataka Kato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 150 days.

(21) Appl. No.: 18/437,087

(22) Filed: Feb. 8, 2024

(65) Prior Publication Data

US 2024/0269980 A1 Aug. 15, 2024

(30) Foreign Application Priority Data

Feb. 13, 2023 (JP) ................................ 2023-019846

(51) Int. Cl.
*B41J 2/14* (2006.01)
*B41J 2/16* (2006.01)

(52) U.S. Cl.
CPC ........... *B41J 2/14233* (2013.01); *B41J 2/161* (2013.01); *B41J 2/1628* (2013.01); *B41J 2002/14241* (2013.01); *B41J 2202/11* (2013.01); *B41J 2202/12* (2013.01)

(58) Field of Classification Search
CPC ...... B41J 2/14233; B41J 2/161; B41J 2/1628; B41J 2002/14241; B41J 2202/11; B41J 2202/12; B41J 2/1623; B41J 2/1631; B41J 2/1632; B41J 2/1646; B41J 2/1629
See application file for complete search history.

(56) References Cited

U.S. PATENT DOCUMENTS

2022/0088923 A1* 3/2022 Shklyarevskiy ..... B41J 2/04578

FOREIGN PATENT DOCUMENTS

JP 2015100919 A * 6/2015

OTHER PUBLICATIONS

Miwa et al., Method of Manufacturing Droplet Discharge Head, Droplet Discharge Head, and Image Formation Device, Jun. 4, 2015, [Description of Embodiments]. (Year: 2015).*

* cited by examiner

*Primary Examiner* — Lisa Solomon
(74) *Attorney, Agent, or Firm* — Canon U.S.A., Inc. IP Division

(57) ABSTRACT

A liquid discharge head includes first, second and third substrates. The second substrate includes a piezoelectric element configured to generate energy for discharging liquid, and a protective layer. The protective layer includes a first protective layer in contact with the piezoelectric element and a second protective layer covering the first protective layer, wherein L3>L1>L2 is satisfied, where L1 is a length of a through hole, L2 is a length of a communication port connecting the through hole and a liquid chamber in the second substrate, and L3 is a length of an opening of the protective layer, on a straight line passing through a center of the through hole when viewed from a direction perpendicular to a surface of the element substrate, and wherein an inner wall surface of the opening of the protective layer is a substantially flat surface.

13 Claims, 7 Drawing Sheets

LIQUID DISCHARGE HEAD, ELEMENT SUBSTRATE AND METHOD FOR MANUFACTURING THE SAME

BACKGROUND

Field of the Disclosure

The present disclosure relates to a liquid discharge head, an element substrate, and a method for manufacturing the same.

Description of the Related Art

A mechanism that uses piezoelectric elements for discharging liquid in a liquid discharge head of a liquid discharge apparatus, such as an inkjet recording apparatus, is known. In the mechanism, part of a liquid chamber storing the liquid is formed using a vibration plate, and a voltage is applied to the piezoelectric elements to deform the vibration plate and contract the liquid chamber so that the liquid is discharged through a discharge opening formed at one end of the liquid chamber.

There are liquid discharge heads that include an element substrate including a discharge opening substrate, an actuator substrate, and a flow path substrate joined together in this order. A discharge opening is formed in the discharge opening substrate. The actuator substrate includes a vibration plate and a piezoelectric film, and a liquid chamber is formed in the actuator substrate. The flow path substrate includes a flow path for supplying liquid to the liquid chamber. Japanese Patent Application Laid-Open No. 2015-100919 discusses a liquid discharge head that includes the above-described element substrate. A wiring layer for feeding electric signals to piezoelectric elements is situated on a side of the actuator substrate that is in contact with the flow path substrate, and an insulative layer and a protective layer are layered to cover the wiring layer.

FIGS. 2A and 2B are cross-sectional views illustrating an element substrate according to a comparative example of the present disclosure. In FIGS. 2A and 2B, an actuator substrate 20 and a flow path substrate 10 are joined together with an adhesive 40, and there is a step shape formed at a joint surface by end portions of an insulative layer 241 and a protective layer 242 near a through hole 100 formed in the flow path substrate 10. In this case, the adhesive 40 on edges of the insulative layer 241 and the protective layer 242 sometimes peels and forms a particle 41.

SUMMARY

The present disclosure is directed to providing a liquid discharge head and an element substrate for a liquid discharge head with high discharge stability and in which formation of particles originating from an adhesive is reduced.

According to an aspect of the present disclosure, a liquid discharge head includes an element substrate including a first substrate including a discharge opening for discharging a liquid, a second substrate joined with the first substrate and including a liquid chamber for supplying the liquid to the discharge opening, and a third substrate joined with the second substrate via an adhesive and including a through hole for supplying the liquid to the liquid chamber, wherein the second substrate includes a piezoelectric element disposed on a surface closer to the third substrate, the piezoelectric element being configured to generate energy for discharging the liquid, and a protective layer covering at least part of the piezoelectric element and including an opening connecting the liquid chamber and the through hole, wherein the protective layer includes a first protective layer in contact with the piezoelectric element and a second protective layer covering the first protective layer, wherein $L3>L1>L2$ is satisfied, where L1 is a length of the through hole, L2 is a length of a communication port connecting the through hole and the liquid chamber in the second substrate, and L3 is a length of the opening of the protective layer, on a straight line passing through a center of the through hole when viewed from a direction perpendicular to a surface of the element substrate, and wherein an inner wall surface of the opening of the protective layer is a substantially flat surface.

According to another aspect of the present disclosure, a method for manufacturing an element substrate for use in a liquid discharge head, the element substrate including a first substrate including a discharge opening for discharging a liquid, a second substrate joined with the first substrate and including a liquid chamber for supplying the liquid to the discharge opening, and a third substrate joined with the second substrate via an adhesive and including a through hole for supplying the liquid to the liquid chamber, includes forming, on a side of the second substrate that is in contact with the third substrate, a piezoelectric element configured to generate energy for discharging the liquid, forming a protective layer f covering the piezoelectric element and including a first protective layer in contact with the piezoelectric element and a second protective layer covering the first protective layer, and forming an opening in the protective layer to connect the liquid chamber and the through hole by etching the first protective layer and the second protective layer simultaneously, wherein $L3>L1>L2$ is satisfied, where L1 is a length of the through hole, L2 is a length of a communication port connecting the through hole and the liquid chamber in the second substrate, and L3 is a length of the opening of the protective layer, on a straight line passing through a center of the through hole when viewed from a direction perpendicular to a surface of the element substrate.

Further features of the present disclosure will become apparent from the following description of exemplary embodiments with reference to the attached drawings.

DESCRIPTION OF THE EMBODIMENTS

Figure 1A:
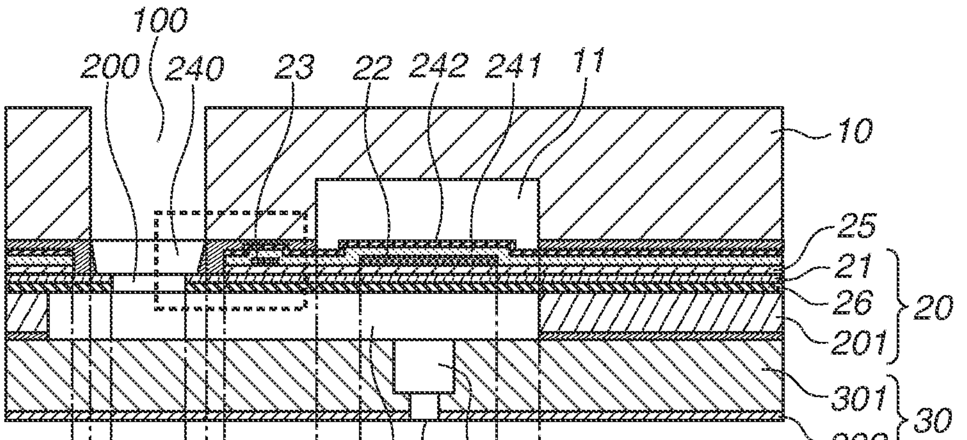
FIG. 1A is a cross-sectional view illustrating an element substrate according to a first exemplary embodiment of the present disclosure.

A structure of a liquid discharge head including an element substrate according to an aspect of the present disclosure will be described below with reference to the drawings. Hereinafter, components having the same function are given the same reference numeral, and redundant descriptions thereof are sometimes omitted. An example of a case where the present disclosure is applied to an element substrate for use in a liquid discharge head of a liquid discharge apparatus as an inkjet printer will be described below. However, an element substrate according to an aspect of the present disclosure can also be used in a liquid discharge head other than liquid discharge heads for use in inkjet printers.

The liquid discharge head includes, for example, an element substrate for discharging liquid, an electric wiring substrate for feeding electric signals to the element substrate, and a housing that stores the element substrate and the electric wiring substrate. The element substrate according to an aspect of the present disclosure will be described below.

A first exemplary embodiment will be described below. FIG. 1A is a cross-sectional view illustrating an element substrate according to the present exemplary embodiment. The element substrate includes a discharge opening substrate 30 (first substrate), an actuator substrate 20 (second substrate), and a flow path substrate 10 (third substrate) joined together in this order. The discharge opening substrate 30 includes a discharge opening 31 and a discharge flow path 32 for discharging liquid. The actuator substrate 20 includes a cavity 27 and a vibration plate 21 including a piezoelectric element 22. The cavity 27 forms a liquid chamber connected with the discharge opening 31 via the discharge flow path 32. The flow path substrate 10 includes a space 11 and a through hole 100. The space 11 is provided for the piezoelectric element 22. The through hole 100 is connected with the cavity 27. The substrates 10, 20, and 30 are joined together using an adhesive according to the present exemplary embodiment.

The actuator substrate 20 is formed using, for example, a silicon-on-insulator (SOI) substrate including a silicon layer 201 in which the cavity 27 is formed, an oxide film 26 formed on a surface of the silicon layer 201 that is on a side closer to the flow path substrate 10, and the vibration plate 21 formed on a surface of the oxide film 26 that is on the opposite side to the silicon layer 201. Furthermore, an oxide film 25 is provided on a surface of the vibration plate 21 that is on the opposite side to the oxide film 26, and a piezoelectric actuator in which the piezoelectric element 22 and a wiring layer 23 (refer to FIG. 1B) are placed is formed on the oxide film 25. The wiring layer 23 transmits electric signals for driving the piezoelectric element 22. The piezoelectric element 22 generates energy for discharging liquid and includes a lower electrode formed on a side closer to the vibration plate 21, a piezoelectric layer, and an upper electrode formed on the opposite side to the lower electrode. The piezoelectric element 22 is formed at a position facing a liquid chamber 27 across the vibration plate 21, and the vibration plate 21 has a characteristic of being deformable in a direction facing the liquid chamber 27. An adhesive layer can be formed between the lower electrode of the piezoelectric element 22 and the wiring layer 23 and the oxide film 25 to improve adhesiveness between the lower electrode of the piezoelectric element 22 and the wiring layer 23 and the oxide film 25. For example, titanium and/or chromium can be used for the adhesive layer. The silicon layer 201 of the actuator substrate 20 includes the plurality of cavities 27, and the number of cavities 27 corresponds to the number of piezoelectric elements 22. The vibration plate 21 of the actuator substrate 20 on the flow path substrate 10 side has a role as a surface forming the liquid chamber 27.

The discharge opening substrate 30 is formed using, for example, a SOI substrate including an oxide film 302 and a silicon substrate 301 joined together. The oxide film 302 is formed on a surface closer to the discharge opening 31. The discharge opening substrate 30 forms, together with the silicon layer 201 and the vibration plate 21, a wall surface of the liquid chamber 27. The discharge opening substrate 30 includes the discharge opening 31 and the discharge flow path 32 at a position overlapping the liquid chamber 27 when viewed in a direction perpendicular to the element substrate so that the discharge flow path 32 connects the discharge opening 31 and the liquid chamber 27. By driving the piezoelectric element 22, the vibration plate 21 deforms, and the liquid chamber 27 changes in volume. Then, liquid supplied to the liquid chamber 27 through the through hole 100 passes through the discharge flow path 32 and is then discharged through the discharge opening 31. At the discharge, the oxide film 25, the vibration plate 21, and the oxide film 26 deform together, so that the oxide film 25, the vibration plate 21, and the oxide film 26 can be collectively considered as a vibration plate.

A structure of the piezoelectric actuator of the actuator substrate 20 will be described in detail below. FIG. 1C is an enlarged view illustrating a dotted line portion in FIG. 1A. As illustrated in FIGS. 1A and 1C, the actuator substrate 20 includes a protective layer 24 formed on a side of the actuator substrate 20 that is in contact with the flow path substrate 10 so that the protective layer 24 covers the piezoelectric element 22 and the wiring layer 23. The protective layer 24 includes an insulative layer 241 (first protective layer) formed to be in contact with the piezoelectric element 22 and a protective layer 242 (second protective layer) formed on the insulative layer 241. Materials for use in the insulative layer 241 include commonly-used insulator materials such as silicon oxide, silicon nitride, silicon oxynitride, and aluminum oxide. The protective layer 242 desirably has high moisture resistance and insulation properties in order to prevent short circuits under high humidity conditions where the piezoelectric element 22 is used. According to the present disclosure, the protective layer 24 needs not cover the entire surface of the piezoelectric element 22, but may cover at least part of the piezoelectric element 22.

Materials for use in the protective layer 242 include silicon oxide films, silicon nitride films, and silicon oxynitride films. Especially, silicon nitride films are desirable because they are resistant to moisture and produce a sufficient effect of protecting the piezoelectric element 22 with a thinner film thickness compared to silicon oxide. The protective layer 24, the oxide film 26 on the silicon layer 201, the vibration plate 21, and the oxide film 25 include an opening at a position corresponding to the through hole 100 to connect the through hole 100 and the liquid chamber 27.

In FIG. 1A, an opening 240 is the opening of the protective layer 24, and a communication port 200 is the opening of the vibration plate 21 and the oxide film 26.

Figure 1B:
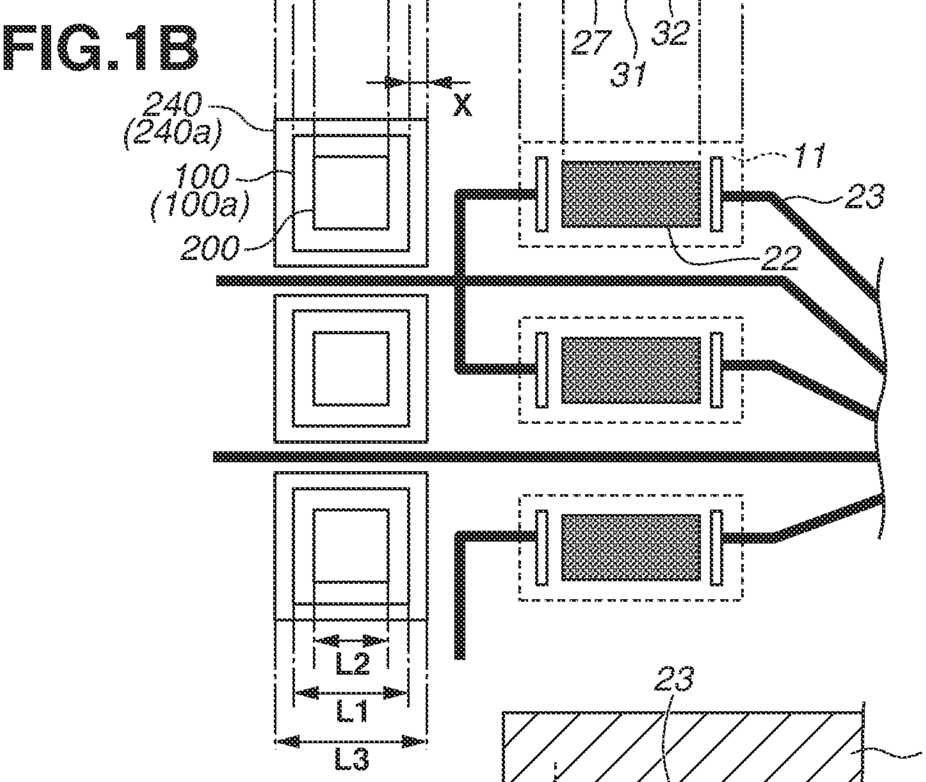
FIG. 1B is a plan view illustrating the element substrate at a position corresponding to FIG. 1A.
Figure 1C:
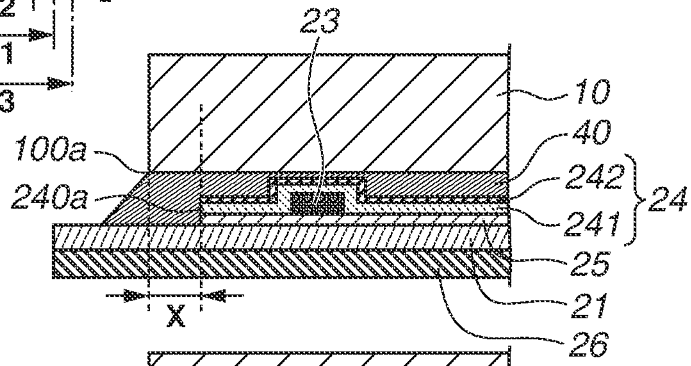
FIG. 1C is an enlarged cross-sectional view illustrating a dotted line portion in FIG. 1A.

FIG. 1B is a plan view illustrating the element substrate according to the present exemplary embodiment at a position corresponding to FIG. 1A. FIG. 2B is a plan view illustrating an element substrate according to a comparative example at a position corresponding to FIG. 2A. According to the present disclosure, when the element substrate is viewed from the direction perpendicular to the element substrate, a periphery 240*a* of the opening 240 of the protective layer 24 is positioned outside a periphery 100*a* of an opening of the through hole 100, and the periphery 240*a* of the opening 240 of the protective layer 24 and the periphery 100*a* of the through hole 100 do not overlap. This reduces the likelihood of peeling for an adhesive 40 having flowed and adhered to an inner wall surface of the opening 240 in the insulative layer 241 and an inner wall surface of the opening 240 in the protective layer 242 in joining the actuator substrate 20 and the flow path substrate 10 including the through hole 100 together using the adhesive 40. Thus, particles originating from the peeled adhesive 40 (refer to FIG. 2C) are reduced, and stable discharge is achieved.

Desirably, the inner wall surface of the opening 240 in the insulative layer 241 and the inner wall surface of the opening 240 in the protective layer 242 are aligned as illustrated in FIGS. 1A and 1C. Specifically, the inner wall surface of the opening 240 in the insulative layer 241 and the inner wall surface of the opening 240 in the protective layer 242 desirably form a single continuous surface. This makes it even easier to prevent the adhesive 40 from peeling and forming particles. At this point, the inner wall surface of the opening 240 of the protective layer 24 including the insulative layer 241 and the protective layer 242 can be also referred to as a substantially (substantially) flat surface. In a case where the inner wall surface of the opening 240 in the insulative layer 241 and the inner wall surface of the opening 240 in the protective layer 242 are aligned, the inner wall surfaces are less likely to form a step shape where the adhesive 40 can peel and form a particle 41 at an interface between the insulative layer 241 and the protective layer 242.

Figure 1D:
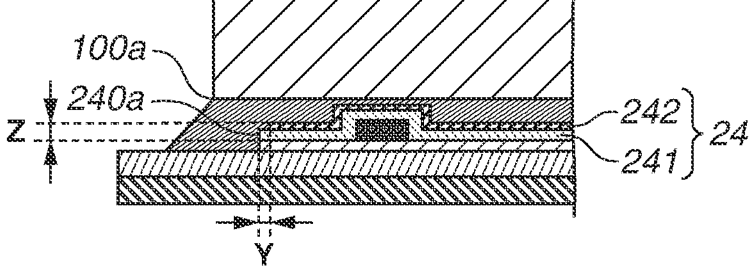
FIG. 1D is a cross-sectional view illustrating another variation of FIG. 1C.

The term "substantially flat" according to the present disclosure encompasses any flatness within the range where an effect of the present disclosure is produced. For example, a distance Y between a periphery of an opening in the insulative layer 241 and a periphery of an opening in the protective layer 242 in a direction parallel to the element substrate and a thickness Z of the inner wall surface of the opening 240 of the protective layer 24, as illustrated in FIG. 1D, desirably satisfy $Y<0.1\times Z$, more desirably $Y<0.05\times Z$, to sufficiently produce an effect of the present disclosure.

According to the present exemplary embodiment, the inner wall surface of the opening 240 of the protective layer 24 and an inner wall surface of an opening of the oxide film 25 are also aligned. This produces an effect of further preventing formation of particles compared to a case where a periphery of the opening in the oxide film 25 is positioned inside the periphery 240*a* of the opening 240 in the protective layer 24 when the element substrate is viewed in the direction perpendicular to the element substrate.

Desirably, an opening diameter L1 of the through hole 100 formed in the flow path substrate 10 is greater than an opening diameter L2 of the communication port 200 formed in the actuator substrate 20 (the vibration plate 21), when the element substrate is viewed in the direction perpendicular to the element substrate. At this time, a region of holding the adhesive 40 on the actuator substrate 20 is secured. In a case where the through hole 100 has a tapered shape or a shape with a varying opening diameter in a liquid discharge direction, the opening diameter L1 of the through hole 100 is considered based on the diameter at a surface that is in contact with the actuator substrate 20. The opening diameter L2 of the communication port 200 is considered based on the diameter at a surface closer to the liquid chamber 27 of the communication port 200. While lengths L1 and L2 of sides of substantially square openings are used according to the present exemplary embodiment, in a case where shapes of openings are not square, a straight line passing through centers of the openings can be drawn on a plane parallel to the element substrate, and lengths L1 and L2 of the openings on the drawn line can be compared.

While the opening diameter relationship of the structure according to the comparative example in FIG. 2B is L1>L3>L2, the opening diameter relationship according to the present exemplary embodiment in FIG. 1B is L3>L1>L2, where L3 is an opening diameter of the protective layer 24. Specifically, since the opening diameter L3 of the protective layer 24 (the insulative layer 241 and the protective layer 242) is greater than the opening diameter L1 of the through hole 100 in the flow path substrate 10, and the communication port 200 of the actuator substrate 20 can be designed with a greater opening diameter L2. This makes it possible to reduce the flow resistance of the liquid flowing in the element substrate and to increase the flow rate, which is advantageous in terms of design. To reduce the flow resistance of the liquid flowing in the element substrate, it is desirable to satisfy $L2>L1\times0.6$, more desirably $L2>L1\times0.75$.

Another feature of the present case is that the adhesive 40 protrudes into an opening region of the through hole 100 in the flow path substrate 10 in joining the substrates together. Edges of the adhesive 40 are not pulled into a space between the flow path substrate 10 and the actuator substrate 20, and this makes it possible to maintain adhesion reliability between the layers due to void formation. The opening (L2) on the downstream side of discharge has the smallest diameter, and the opening diameter of the edge of the adhesive 40, the opening diameter (L1) of the flow path substrate 10, and the opening diameter (L3) of the protective layer 24 increase in this order from the opening (L2).

Figure 2A:
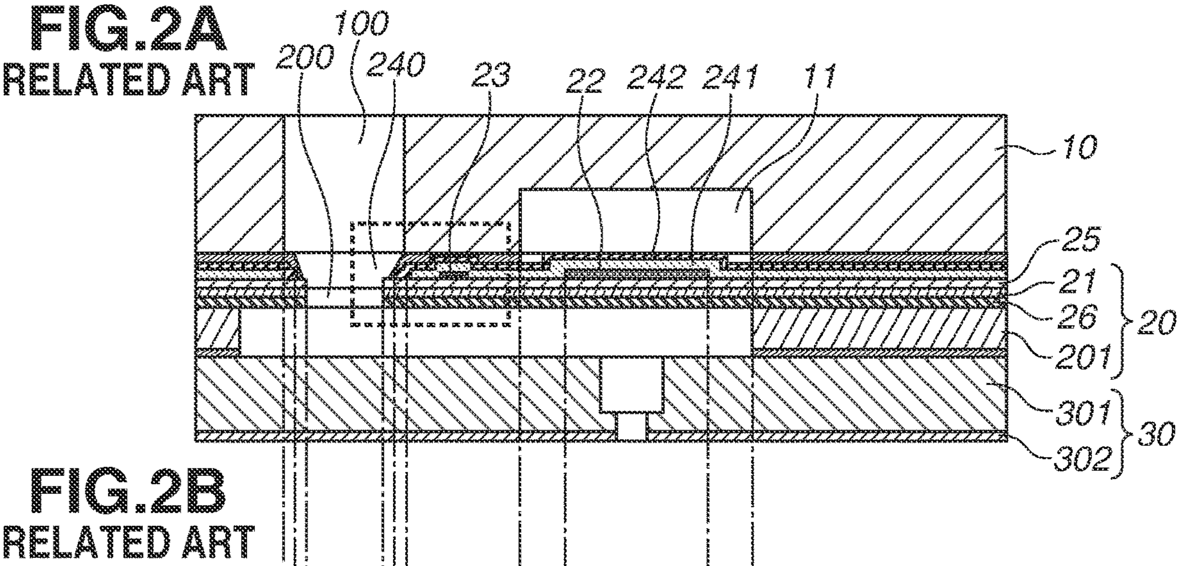
FIG.2A RELATED ART
FIG. 2A is a cross-sectional view illustrating an element substrate according to a comparative example.
Figure 2B:
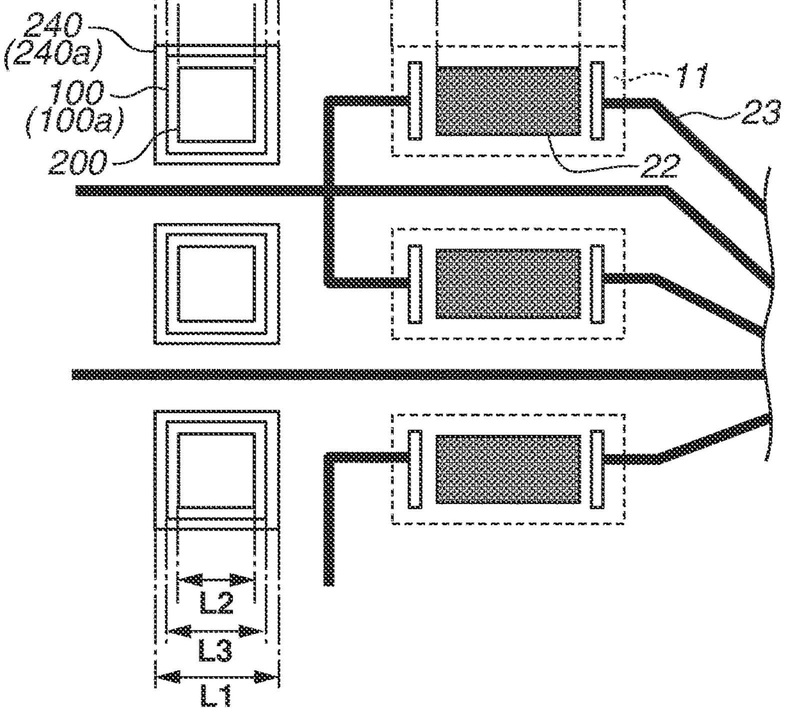
FIG.2B RELATED ART
FIG. 2B is a plan view illustrating the element substrate at a position corresponding to FIG. 2A.
Figure 2C:
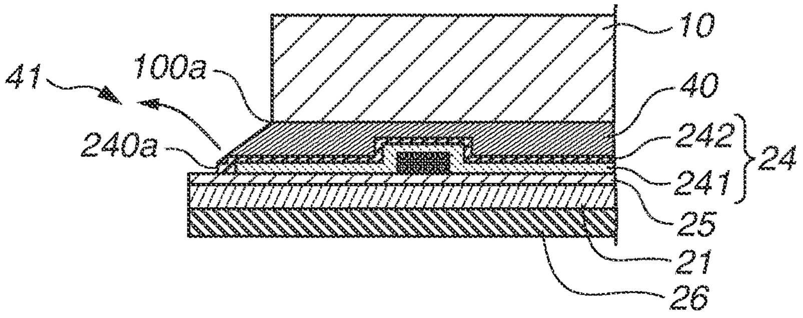
FIG.2C RELATED ART
FIG. 2C is an enlarged cross-sectional view illustrating a dotted line portion in FIG. 2A.

FIGS. 1C and 2C are diagrams illustrating dotted-line regions in FIGS. 1A and 2A and are enlarged views illustrating a joint portion of the flow path substrate 10 and the actuator substrate 20 near the through hole 100.

Desirably, a distance X from the periphery 100*a* of the through hole 100 to the periphery 240*a* of the opening 240 of the protective layer 24 in the direction parallel to the element substrate is 5 μm or greater, more desirably 10 μm or greater, when viewed from the direction perpendicular to the element substrate. Having a sufficient distance X makes it easier to prevent formation of particles caused by peeling of the adhesive 40. The magnitude of the distance X can be determined based on the distance between the wiring layer 23 and the through hole 100.

In this region, the adhesive 40 is in contact with both the flow path substrate 10 and the actuator substrate 20 (the vibration plate 21). In a case where both the flow path substrate 10 and the actuator substrate 20 (the vibration plate 21) are formed using a silicon substrate, upper and lower sides of the adhesive 40 have the same wettability and spreading properties. This produces an effect of mitigating excessive protrusion of the adhesive 40 toward the substrate opening.

A method for manufacturing an element substrate according to the present exemplary embodiment will be described below.

FIGS. 3A to 3H are diagrams illustrating a sequence of manufacturing an element substrate according to the present exemplary embodiment.

Figure 3A:
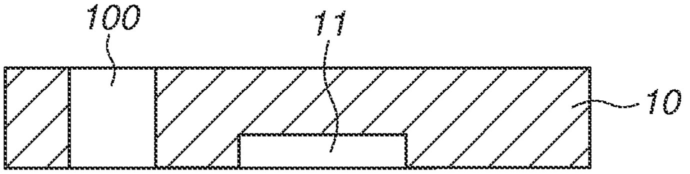
FIGS. 3A to 3H are diagrams illustrating a process of manufacturing an element substrate according to the first exemplary embodiment of the present disclosure.

The flow path substrate 10 made of silicon and including the through hole 100 and the space 11 as illustrated in FIG. 3A are prepared.

Figure 3B:
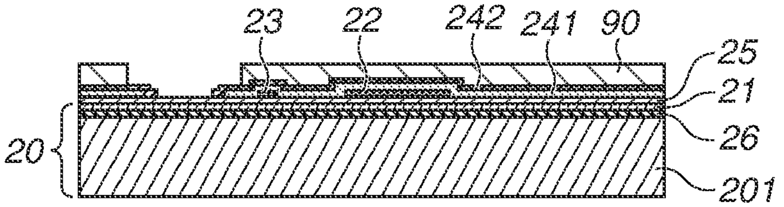

A SOI substrate 20 for forming the actuator substrate 20 including a silicon layer 201, a BOX layer (oxide film) 26 made of $SiO_2$ and formed on the silicon layer 201, and a silicon layer 21 formed on the BOX layer 26 as illustrated in FIG. 3B are prepared. Next, a silicon oxide film is formed as the oxide film 25 on the silicon layer 21, and the piezoelectric element 22 and the wiring layer 23 for driving the piezoelectric element 22 are formed on the oxide film 25. Thereafter, P—SiO is formed by chemical vapor deposition (CVD) as the insulative layer 241 to cover the piezoelectric element 22, and P—SiN is formed as the protective layer 242 on the P—SiO. The insulative layer 241 desirably has a film thickness greater than or equal to 0.1 μm and less than or equal to 2.0 μm, more desirably greater than or equal to 0.1 μm and less than or equal to 0.5 μm. The protective layer 242 desirably has a film thickness greater than or equal to 0.1 μm and less than or equal to 2 μm, more desirably greater than or equal to 0.1 μm and less than or equal to 0.5 μm. Thereafter, an etching mask 90 for etching the insulative layer 241 and the protective layer 242 are patterned by photolithography.

Figure 3C:
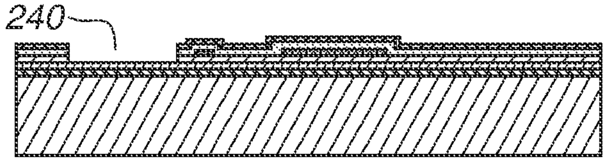

As illustrated in FIG. 3C, the opening 240 is formed in the insulative layer 241 and the protective layer 242 simultaneously by dry etching using the etching mask 90. Desirably, reactive ion etching (RIE) is used in etching the insulative layer 241 and the protective layer 242. According to the present exemplary embodiment, a mixed gas of $C_4F_8$, $CF_4$, and Ar gas is used, and reactive ion etching is performed using an inductively coupled plasma (ICP) apparatus. Control conditions at this time are a gas pressure of 0.3 Pa, a gas flow rate of 500 sccm, a coil power of 1500 W, and a platen power of 400 W, as an example. The etching of the insulative layer 241 and the protective layer 242 can be performed using a reactive ion etching apparatus that includes a plasma source of another method. For example, an electron cyclotron resonance (ECR) apparatus or a magnetic neutral line discharge (NLD) plasma apparatus can be used.

An advantage of removing the insulative layer 241 and the protective layer 242 collectively by dry etching is that a smaller region is used compared to a case of patterning the insulative layer 241 and the protective layer 242 separately. Because a clearance from the through hole 100 to the wiring layer 23 is easily secured, an effect of facilitating size reduction of the element substrate is produced.

Figure 3D:
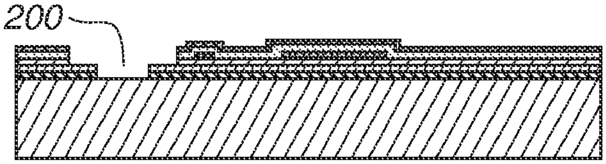

As illustrated in FIG. 3D, an etching mask for forming the communication port 200 is formed, and an opening 200 is formed in a silicon layer 202 and the BOX layer 26 by dry etching. The etching of the silicon layer 21 is performed by a Bosch process using a $SF_6$ gas as an etching gas and a $C_4F_8$ gas as a coating gas. The etching of the BOX layer (oxide film) 26 thereunder is performed using the same conditions as the etching of the insulative layer 241 and the protective layer 242 described above.

Figure 3E:
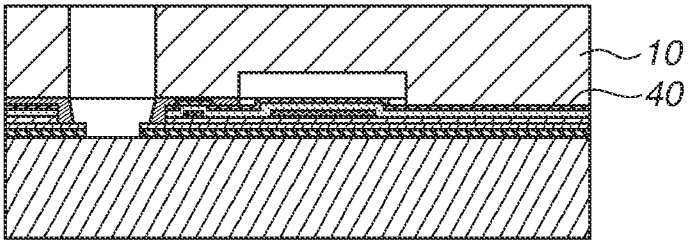

As illustrated in FIG. 3E, the flow path substrate 10 and the actuator substrate 20 are joined together using the adhesive 40. A thermosetting resin containing benzocyclobutene (BCB) as an example is used as the adhesive 40. Any adhesive having adhesiveness to the substrates and resistance to the liquid to discharge can be used.

Figure 3F:
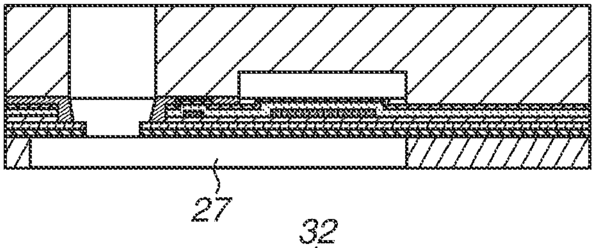

After the thickness of the actuator substrate 20 is adjusted to an intended thickness by processing the actuator substrate 20 from the opposite side to the flow path substrate 10, the cavity 27 is formed by photolithography and Si etching as illustrated in FIG. 3F.

Figure 3G:
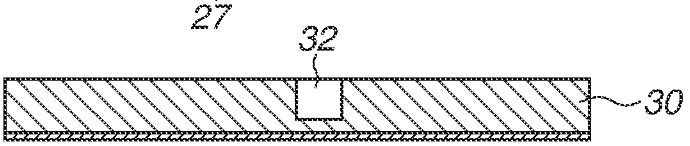

As illustrated in FIG. 3G, the discharge opening substrate 30 is prepared, and a recessed portion 32 is formed as the discharge flow path 32 by dry etching. While a silicon substrate is used as the discharge opening substrate 30 according to the present exemplary embodiment, stainless steel can be used.

Figure 3H:
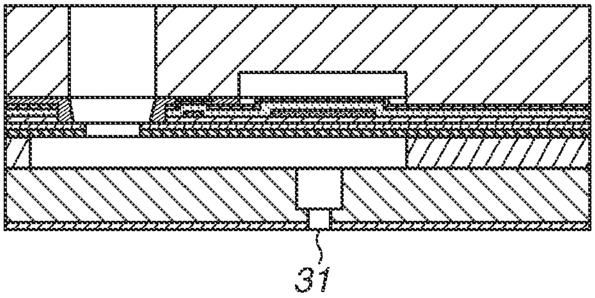

As illustrated in FIG. 3H, the actuator substrate 20 and the discharge opening substrate 30 are joined together. Then, a resist mask is formed on a surface of the discharge opening substrate 30 on the opposite side to the actuator substrate 20, and the discharge flow path 32 is formed through by dry etching, followed by formation of the discharge opening 31, whereby an element substrate for a liquid discharge head according to the present disclosure is formed.

Main differences between exemplary embodiments described below and the first exemplary embodiment described above will be described below, and redundant descriptions of portions that are similar to those described above are omitted.

Figure 4A:
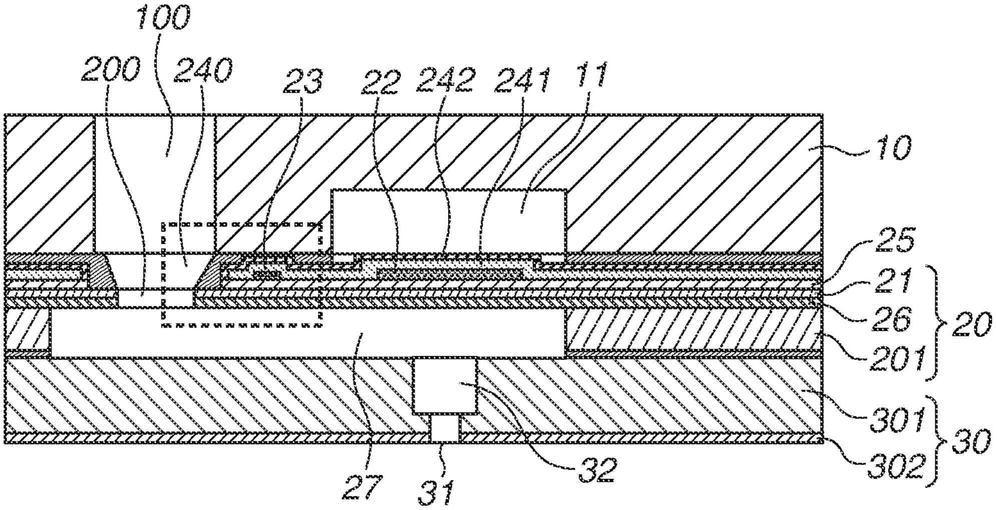
FIG. 4A is a cross-sectional view illustrating an element substrate according to a second exemplary embodiment of the present disclosure.
Figure 4B:
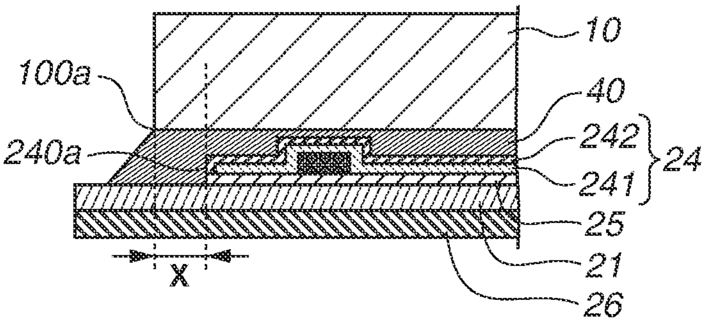
FIG. 4B is an enlarged cross-sectional view illustrating a dotted line portion in FIG. 4A.

A second exemplary embodiment will be described below. FIGS. 4A and 4B are cross-sectional views illustrating an element substrate according to the present exemplary embodiment corresponding to FIG. 1. According to the present exemplary embodiment, an edge of the insulative layer 241 is covered by the protective layer 242 at the inner wall surface of the opening 240 of the protective layer 24. In this case, the insulative layer 241 is prevented from coming into contact with a discharged liquid and dissolving in the liquid, and an effect of enhancing electric reliability of the element substrate and the liquid discharge head is produced. With this structure, an effect of the present disclosure is still produced in a case where an end portion of the protective layer 24, i.e., a periphery of an opening in the insulative layer 241 according to the present exemplary embodiment, is positioned outside the periphery 100*a* of the through hole 100 and does not overlap the periphery 100*a* of the through hole 100 when viewed from the direction perpendicular to the element substrate, and the inner wall surface of the opening 240 in the insulative layer 241 is a substantially flat surface. According to the present exemplary embodiment, the insulative layer 241 and the protective layer 242 are patterned separately to form the structure in which the edge of the insulative layer 241 in the opening 240 is covered by the protective layer 242.

Figure 5:
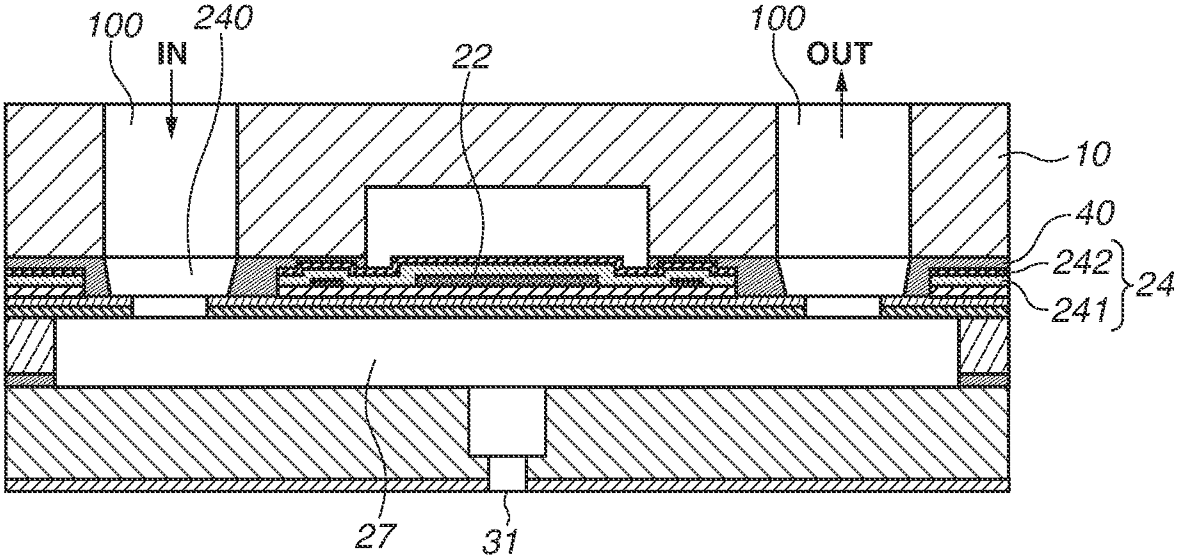
FIG. 5 is a cross-sectional view illustrating an element substrate according to a third exemplary embodiment of the present disclosure.

A third exemplary embodiment will be described below. FIG. 5 is a cross-sectional view illustrating an element substrate according to the present exemplary embodiment. According to the present exemplary embodiment, two through holes 100 are connected to each pair of the piezoelectric element 22 and the liquid chamber 27. The through holes 100 formed in the flow path substrate 10 are positioned to sandwich the piezoelectric element 22 and the discharge opening 31 for the piezoelectric element 22 in the direction parallel to the element substrate. While liquid is supplied to the liquid chamber 27 through one of the through holes 100, the liquid is collected from the liquid chamber 27 through another one of the through holes 100, whereby the liquid is circulated between the liquid chamber 27 and the outside of the element substrate and the liquid discharge head to prevent thickening of the liquid. Alternatively, liquid can be supplied through both of the two through holes 100 without circulating the liquid.

In the element substrate with the structure capable of circulating liquid according to the present exemplary embodiment, the inner wall surface of the opening 240 in the insulative layer 241 and the inner wall surface of the opening 240 in the protective layer 242 of the protective layer 24 can be aligned as in the first exemplary embodiment, or the edge of the insulative layer 241 can be covered by the protective layer 242 in the opening 240 of the protective layer 24 as in the second exemplary embodiment.

Figure 6:
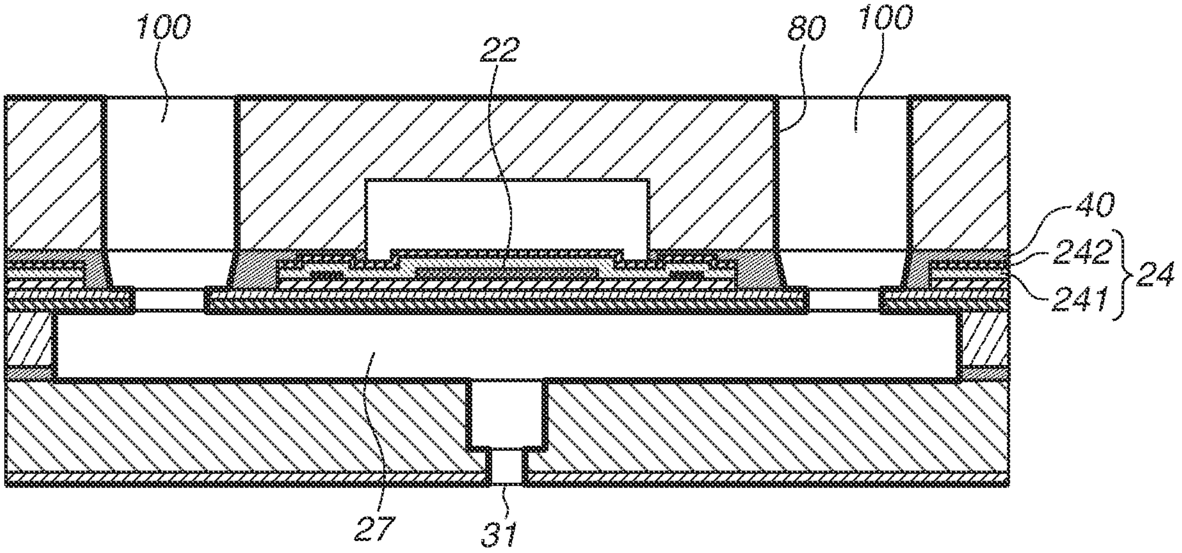
FIG. 6 is a cross-sectional view illustrating an element substrate according to a fourth exemplary embodiment of the present disclosure.

A fourth exemplary embodiment will be described below. FIG. 6 is a cross-sectional view illustrating an element substrate according to the present exemplary embodiment. As illustrated in FIG. 6, the present exemplary embodiment is similar to the third exemplary embodiment in that liquid can be circulated, and surfaces that come into contact with the liquid are covered by a corrosion-resistant film 80. According to the present exemplary embodiment, tantalum oxide formed as a continuous film by atomic layer deposition (ALD) is used for the corrosion-resistant film 80, as an example. The corrosion-resistant film 80 is desirably a uniformly-formed film, so that use of a film formed by ALD as the corrosion-resistant film 80 is desirable. For example, titanium oxide or hafnium oxide that can be formed into a film by ALD can be used suitably. The corrosion-resistant film 80 can be a film formed by layering a plurality of layers.

Unlike the structure according to the comparative example in which the adhesive 40 peels easily and forms particles near the through hole 100, the structure according to the present exemplary embodiment prevents formation of particles originating from peeling of the adhesive 40. Consequently, peeling of the corrosion-resistant film 80 is also prevented. While the element substrate illustrated in FIG. 6 has the structure in which the liquid can be circulated as in the third exemplary embodiment, the structure with the corrosion-resistant film 80 is also applicable to a structure in which the liquid cannot be circulated as illustrated in FIG. 1A.

Figure 7A:
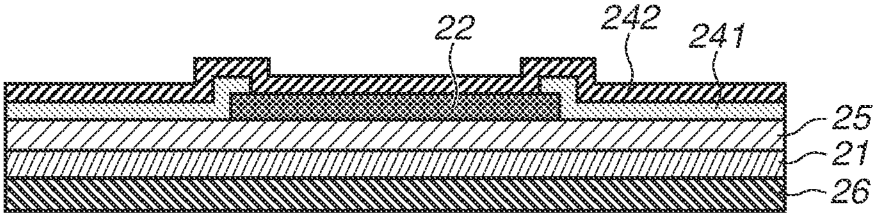
FIGS. 7A and 7B are cross-sectional views illustrating a neighborhood of a piezoelectric element of an element substrate according to a fifth exemplary embodiment of the present disclosure.
Figure 7B:
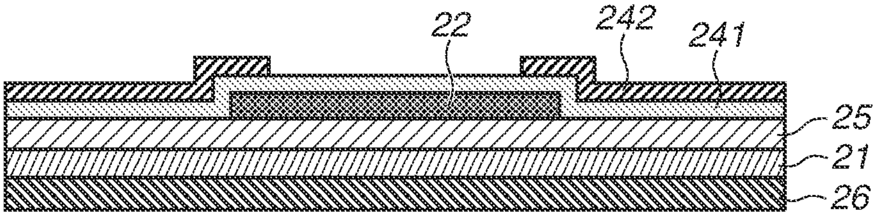

A fifth exemplary embodiment will be described below. FIGS. 7A and 7B are cross-sectional views illustrating a neighborhood of the piezoelectric element 22 of an element substrate according to the present exemplary embodiment. The present disclosure is also applicable to a structure in which at least one of the insulative layer 241 or the protective layer 242 includes an opening on a surface of the piezoelectric element 22 that is on the opposite side to the vibration plate 21. In FIG. 7A, the insulative layer 241 is interrupted on the piezoelectric element 22, whereas in FIG. 7B, the protective layer 242 is interrupted on the piezoelectric element 22. The structure according to the present exemplary embodiment makes it possible to decrease rigidity of the piezoelectric actuator and to deform the vibration plate 21 at a lower voltage, so that an effect of enhancing drive efficiency of the piezoelectric actuator is produced. The present disclosure is also applicable to a structure in which both the insulative layer 241 and the protective layer 242 includes an opening on a surface of the piezoelectric element 22 that is on the opposite side to the vibration plate 21.

According to the present disclosure, an element substrate for a liquid discharge head with high discharge stability and in which formation of particles originating from an adhesive is reduced is provided.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-019846, filed Feb. 13, 2023, which is hereby incorporated by reference herein in its entirety.

What is claimed is:

1. A liquid discharge head comprising an element substrate, the element substrate including:
- a first substrate including a discharge opening for discharging a liquid;
- a second substrate joined with the first substrate and including a liquid chamber for supplying the liquid to the discharge opening; and
- a third substrate joined with the second substrate via an adhesive and including a through hole for supplying the liquid to the liquid chamber,
- wherein the second substrate includes:
  - a piezoelectric element disposed on a surface closer to the third substrate, the piezoelectric element being configured to generate energy for discharging the liquid; and
  - a protective layer covering at least part of the piezoelectric element and including an opening connecting the liquid chamber and the through hole,
- wherein the protective layer includes a first protective layer in contact with the piezoelectric element and a second protective layer covering the first protective layer,
- wherein L3>L1>L2 is satisfied, where L1 is a length of the through hole, L2 is a length of a communication port connecting the through hole and the liquid chamber in the second substrate, and L3 is a length of the opening of the protective layer, on a straight line passing through a center of the through hole when viewed from a direction perpendicular to a surface of the element substrate,
- wherein an inner wall surface of the opening of the protective layer is a substantially flat surface, and
- wherein the inner wall surface of the opening of the protective layer is in contact with the adhesive.

2. The liquid discharge head according to claim 1, wherein in the opening of the protective layer, an inner wall surface of an opening in the first protective layer and an inner wall surface of an opening in the second protective layer are aligned when viewed from the direction perpendicular to the surface of the element substrate.

3. A liquid discharge head comprising an element substrate, the element substrate including:
- a first substrate including a discharge opening for discharging a liquid;
- a second substrate joined with the first substrate and including a liquid chamber for supplying the liquid to the discharge opening; and
- a third substrate joined with the second substrate via an adhesive and including a through hole for supplying the liquid to the liquid chamber,
- wherein the second substrate includes:
  - a piezoelectric element disposed on a surface closer to the third substrate, the piezoelectric element being configured to generate energy for discharging the liquid; and a protective layer covering at least part of the piezoelectric element and including an opening connecting the liquid chamber and the through hole, wherein the protective layer includes a first protective layer in contact with the piezoelectric element and a second protective layer covering the first protective layer, wherein L3>L1>L2 is satisfied, where L1 is a length of the through hole, L2 is a length of a communication port connecting the through hole and the liquid chamber in the second substrate, and L3 is a length of the opening of the protective layer, on a straight line passing through a center of the through hole when viewed from a direction perpendicular to a surface of the element substrate, wherein an inner wall surface of the opening of the protective layer is a substantially flat surface, and wherein in the opening of the protective layer, an edge of the first protective layer is covered by the second protective layer.

4. The liquid discharge head according to claim 1, wherein L2>L1×0.6 is satisfied, where L1 is an opening diameter of the through hole and L2 is an opening diameter of the communication port connecting the through hole and the liquid chamber in the second substrate, when viewed from the direction perpendicular to the surface of the element substrate.

5. The liquid discharge head according to claim 1, wherein L2>L1×0.75 is satisfied, where L1 is an opening diameter of the through hole and L2 is an opening diameter of the communication port connecting the through hole and the liquid chamber in the second substrate, when viewed from the direction perpendicular to the surface of the element substrate.

6. The liquid discharge head according to claim 1, wherein the first protective layer is silicon oxide, and the second protective layer is silicon nitride.

7. The liquid discharge head according to claim 1, wherein a distance from a periphery of the through hole to a periphery of the protective layer is greater than or equal to 5 μm, when viewed from the direction perpendicular to the surface of the element substrate.

8. The liquid discharge head according to claim 1, wherein the third substrate further includes a second through hole for collecting the liquid from the liquid chamber, and wherein the liquid is allowed to circulate between the liquid chamber and outside.

9. The liquid discharge head according to claim 1, wherein a surface in the element substrate that is to be in contact with the liquid is covered by a corrosion-resistant film.

10. The liquid discharge head according to claim 9, wherein the corrosion-resistant film includes tantalum oxide.

11. The liquid discharge head according to claim 1, wherein both of the second substrate and the third substrate are silicon substrates.

12. The liquid discharge head according to claim 1, wherein at least one of the first protective layer or the second protective layer includes an opening on a surface of the piezoelectric element that is on an opposite side to a side closer to the vibration plate.

13. An element substrate for use in a liquid discharge head, the element substrate comprising:

a first substrate including a discharge opening for discharging a liquid;

a second substrate joined with the first substrate and including a liquid chamber for supplying the liquid to the discharge opening; and a third substrate joined with the second substrate via an adhesive and including a through hole for supplying the liquid to the liquid chamber, wherein the second substrate includes:

a piezoelectric element on a surface closer to the third substrate, the piezoelectric element being configured to generate energy for discharging the liquid; and a protective layer covering at least part of the piezoelectric element and including an opening connecting the liquid chamber and the through hole, wherein the protective layer includes a first protective layer in contact with the piezoelectric element and a second protective layer covering the first protective layer, wherein L3>L1>L2 is satisfied, where L1 is a length of the through hole, L2 is a length of a communication port connecting the through hole and the liquid chamber in the second substrate, and L3 is a length of the opening of the protective layer, on a straight line passing through a center of the through hole when viewed from a direction perpendicular to a surface of the element substrate, wherein an inner wall surface of the opening of the protective layer is a substantially flat surface, and wherein the inner wall surface of the opening of the protective layer is in contact with the adhesive.

* * * * *